May 13, 1969 — C. DUBREUIL — 3,443,621
APPARATUS FOR THE GRANULATION OF FLUID PRODUCTS
Filed Feb. 24, 1967

INVENTOR
Claude Dubreuil
BY Tourover and Browdy
ATTORNEY

United States Patent Office 3,443,621
Patented May 13, 1969

---

3,443,621
APPARATUS FOR THE GRANULATION OF FLUID PRODUCTS
Claude Dubreuil, Pont-de-Claix, France, assignor to Progil, Paris, France, a corporation of France
Filed Feb. 24, 1967, Ser. No. 618,376
Claims priority, application France, Jan. 26, 1967, 47,005
Int. Cl. B01d *1/16;* F26b *17/10*
U.S. Cl. 159—4                                       4 Claims

ABSTRACT OF THE DISCLOSURE

Apparatus for granulating fluid products by the fluidised technique including a cylindrical granulator having a truncated cone-shaped base which forms a convergent-divergent system with the funnel for blowing in the stream of gas-provided with a convergent-divergent type of device mounted at the lower part of the granulator at the center of the convergent portion to guide the gas stream before it arrives at fluidised bed of granules, and means for raising and lowering this device with respect to the granulator. A zig-zag type baffle is placed at the upper portion of the granulator to retain the fine particles from passing out of the granulator. An inclined wall baffle is placed below the convergent-divergent type of device for dynamic equilibration of the gas stream before it reaches the device.

---

Figure 1:
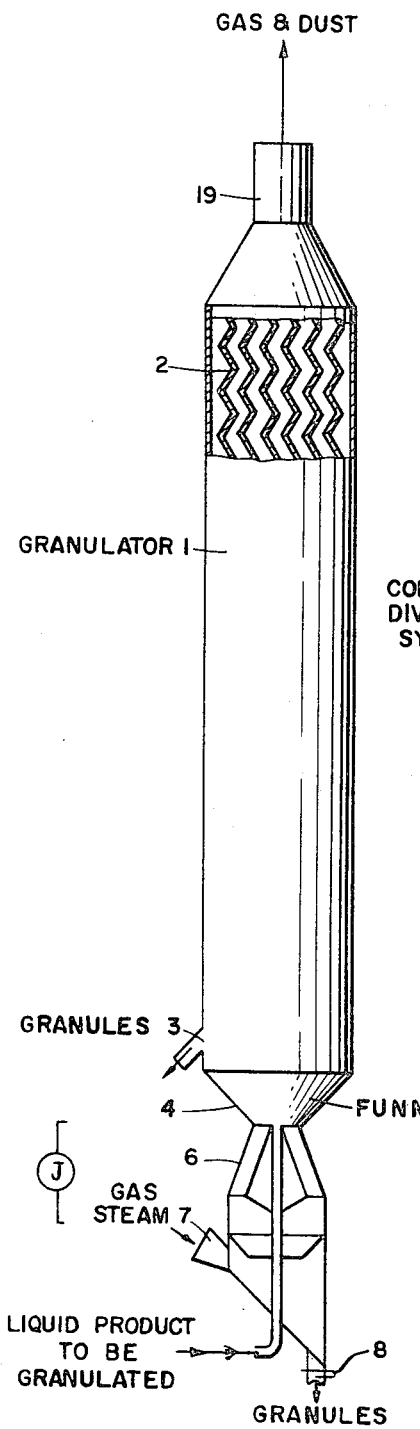

The present invention relates to a process of granulation and simultaneously of drying of fluid substances such as solutions, pastes and liquids. More particularly, it relates to an apparatus which makes it possible to obtain free-flowing granules of essentially regular size and shape.

It is known to manufacture granules from products in a fluid state by the fluidisation technique according to which the fluid product is injected into a rising stream of gas in a fluidised bed containing a suspension of small solid particles which serve as a support for the granules being formed. The stream of gas is directed at the center of the fluidised bed at such a speed that it forces the particles of the bed which are subjected to this stream to move upwards to form a sort of geyser, while the periphery of the channel caused by the stream of gas forms a relatively undisturbed zone where the granules which are being formed undergo a downward movement and then arrive at the central injection zone where they are recycled in the rising stream. The granulation thus takes place by successive deposition of thin layers of the atomised fluid onto the initial particles of the fluidised bed. The drying of the granules being formed is simultaneously achieved by using a hot gas. A particular embodiment of this process is, for example, described in French Patent No. 1,258,497 of Apr. 28, 1960.

Furthermore various apparatuses suitable for this fluidisation technique and based on the principle of simultaneous atomisation of the hot gas stream and the fluid to be granulated in the central portion of the base of an apparatus of truncated cone shape provided with standard devices such as overflows and weirs for recovering and sizing the granules produced have been previously described.

In one of these devices, shown schematically in French Patent No. 1,275,463 of Sept. 28, 1960, the use of a granulator ending at its base in a steep-angled funnel which is attached to a restricted cross-sectional area at the center of which the nozzle for injecting the fluid to be granulated is arranged, has been proposed; the combination of a funnel and a restrictive cross-sectional area constitutes a convergent-divergent system which is intended to cause considerable acceleration of the flow of gas.

Apart from the fact that it is limited to the manufacture of granules of diameter at least equal to, and generally greater than, 2 mm., such a device does not prove entirely satisfactory when operated continuously. In effect, the formation of coarse agglomerates and adhering material in the lower part of the funnel (injection zone) frequently causes blockage of the fluidised movement of the granules after 2 to 3 hours running. This type of breakdown requires emptying the bed of granules and cleaning the granulator and frequently makes it necessary to resort to a new bottom layer of solid particles or to sieving if, during the course of the abovementioned incident, the bed has been excessively moistened or if numerous granules of large diameter, greater than 8 to 10 mm., have formed.

Furthermore, the use of a simple injection tube, even when well centered in the channel produced in the convergent-divergent system of the bottom of the funnel, does not allow the ascending gas stream to be guided perfectly since under these conditions the stream does not have sufficient uniformity of dynamic pressure at all points of its cross-section. This phenomenon results in an instability of the rising channel which passes through the bed of granules, so that this bed is not always uniformly distributed about the periphery of the gas stream. Furthermore disturbances in the speed of the granules occur in the zone where the fluid to be granulated is injected, and this causes irregularities in the deposition of material onto the base particles.

It has now been found that the abovementioned disadvantages, and especially the blockage of the movement of the granules as well as the irregularities in the speed of the gas stream can be reduced by adding certain improvements to the abovementioned type of granulator, which makes it possible to obtain granules of very small diameter, equal to or less than 1 mm. In effect, the defects of the known systems become accentuated if, when seeking to produce fine granulation, one is led to reduce the speed of injection of the gas stream as much as possible and thus to decide on as large an entry opening as possible for the granulator.

The new type of fluidised bed granulator of the present invention essentially differs from apparatuses of a known type in which the base consists of a convergent-divergent system, firstly by the presence, in the very center of the convergent section, of a special device for guiding the gas flow before it arrives at the inlet opening of the fluidised bed of granules, and secondly by the use, in the upper part of the granulator, of an assembly of baffles which are intended to retain the very fine granules of diameters as low as 0.1 to 0.2 mm., which are normally carried out of the granulator by the stream of gas used in existing systems.

Figure 2:
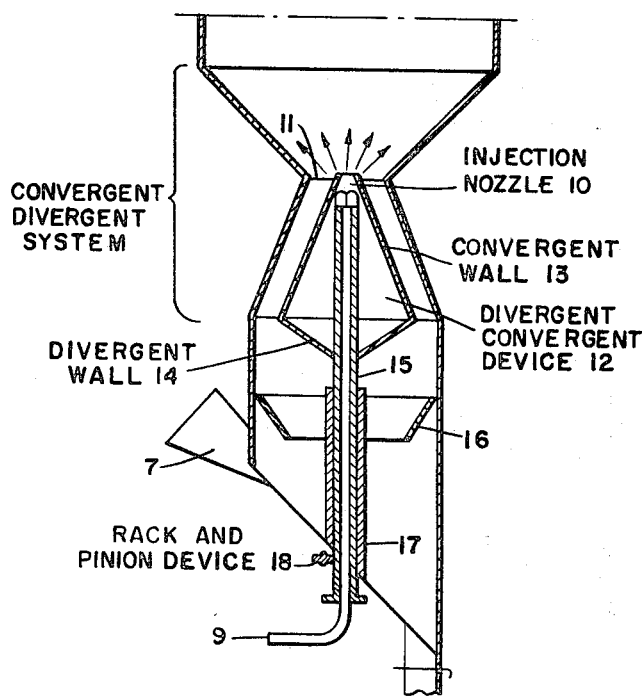

The improvements proposed above will be better understood by reference to FIGURES 1 and 2 of the attached drawings in which:

FIGURE 1 represents a schematic plan view, in axial cross-section, of the granulator of the invention, and FIGURE 2 shows an enlarged view of the device for guiding the stream of gas, located in the convergent part of the base of the granulator.

The granulator consists of a cylindrical jacket 1 having a vertical axis, the height of which may vary, for example from 4 to 7 meters. In its upper part it is provided with baffle devices 2 preferably consisting of metal sheets folding zig-zag, arranged in parallel over a variable height which in the most common case is however approximately equal to the diameter of the granulator. In the lower half of the granulator is an overflow 3 for the particles, and the granulator ends at its base in a truncated cone funnel 4 which forms a whole with a hollow assembly 5, also of truncated cone shape, which is intended to feed the gas stream. The jacket of this assembly has a convergent wall 6, an inclined inlet tube 7 intended for the supply of the gas stream, and a device 8 for emptying out the granules.

The slope of the funnel 4 assumes great importance in the continuous use of the granulator. Contrary to known apparatuses in which it is proposed to provide a very steep slope, it has been found advantageous, according to the invention, for this slope to be reduced as much as possible while still ensuring uniform flow of the granules to the base of the granulator. It may be defined as a natural talus angle found with the granules which constitute the fluidised bed. In the most unfavorable limiting case (a very fine bed and particles which are only slightly rounded) it is about 75%, corresponding to a funnel angle of 103°. In practice this angle is reduced by 5 to 7° by way of a safety margin. In this way the granules roll on the walls of the funnel with a minimum of acceleration and reach the edge of the rising gas stream practically without having acquired any speed from their fall. By the same token the formation of deposits of the fluid to be granulated and of granule agglomerates is avoided.

The hollow assembly 5 has within it, firstly a central channel 9 intended to feed the fluid product which is to be granulated and ending in an injection nozzle 10, and secondly the device of the invention which causes streamlining and progressive acceleration of the gas stream fed in through the tube 7 before it reaches the opening 11 where it enters the bed of granules.

This device consists of a central body 12 arranged at the center of the convergent section 6 and having essentially the same height as the latter. It is defined by a convergent wall 13 closed at its base by a divergent wall 14 which ensures that the gas stream slips towards the convergent channels defined between the walls 6 and 13. It is integral with a tubular support 15 at the center of which the injection tube 9, already referred to, is arranged. In order to complete the dynamic equilibration of the gas stream without excessively lengthening the vertical assembly 5, the baffle 16 having inclined walls, the orifice of which has a cross-section approximately equal to 1.5 times the cross-section 11 is positioned in front of the convergent section 6.

The assembly of the central body 12, the tube 15 and the channel 9 can be moved within a guide tube 17. Furthermore a rack device 18, engaged with the tube 15, makes it possible to vary the relative positions of the body 12 and the assembly 5. Thus the cross-section 11 of the orifice through which the gas stream enters can be sensitively varied and as a result the speed of the injected air can be regulated at any time.

Finally, in case of trouble in the system for atomising the fluid which is to be granulated, the channel 9 may be easily withdrawn from its support guide 15 without at the same time changing the stream of carrier gas fed in through 7. The positioning of this channel along the axis of the body 12 automatically ensures that it is perfectly centered.

According to a variation, the central body 12 of the invention may, instead of being a truncated cone, be given a prismatic shape if the bottom of the funnel has this latter configuration, as is for example indicated in French Patent No. 1,328,974 of Apr. 24, 1962.

In carrying out the granulation and drying process according to the invention, the fluid fed in through 9 is atomised at the same time that the carrier gas stream, which will control the speed of fluidisation in the bed of particles in the granulator, is passed in through the tube 7 and then successively streamlined and progressively accelerated due to the presence of the baffle 16 and the system 13. The granules of the desired size, whose diameter generally is less than 2 mm., are expelled through the overflow 3 of the granulator, whilst the very fine particles (0.1 to 0.2 mm.) are stopped by the baffles 2 and recycled in the fluidised bed. Dust is removed at 19 through the top of the granulator and is passed into standard devices for dust removal, which are not shown.

It is to be understood that the overall installation for granulating and drying comprises a series of attached apparatuses such as systems for charging, sieving, possibly grinding and recycling particles into the granulator, as well as a combustion chamber if the fluidisation gas stream has to be heated before being introduced into the blow tube. These well-known devices have not been shown in the attached drawings.

The granulator of the present invention makes it possible to manufacture regular granules of spherical appearance continuously from substances which are liquid or pasty or are even in the form of fine crystals. Thus, for example, it is possible to obtain granules of products such as fertilizers, pharmaceutical substances, synthetic zeolites (i.e. ion exchanges), various pesticides etc. This apparatus is particularly advantageous for the manufacture of granules of diameter equal to or less than 2 mm., because of the precision and flexibility with which it may be regulated.

By way of a non-limiting example, 35 tons of granules of sodium pentachlorophenate whose diameter, which was very uniform, was about 1 mm., were continuously manufactured for 13 days in a granulator according to the invention having a volume of 2.5 m.$^3$, by feeding the fluid channel 9 with 420 kg./hr. of an aqueous solution containing 350 g./l. of pentachlorophenate and passing 2000 m.$^3$/hr. of air heated to about 380° C. into the tube 7.

It will be obvious to those skilled in the art that various changes may be made without departing from the spirit of the invention and therefore the invention is not limited to what is shown in the drawings and described in the specification, but only as indicated in the appended claims.

What is claimed is:

1. In an apparatus for granulating and drying fluid products by the fluidised granule bed technique in a cylindrical granulator having a hollow inverted, frusto-cone shaped base which forms a convergent-divergent system, and an inlet duct located below the convergent-divergent system for admitting a stream of gas, the improvement which comprises at the axis of said convergent portion and at the same elevation, a closed, base-to-base double-cone divergent-convergent, coaxial device adapted to guide the gas stream between the converging portions of the convergent-divergent system and the divergent-convergent device prior to admission of the gas stream to the above-positioned, fluidised bed of granules, said divergent-convergent device being assembled integrally with a tubular support at its center in which is arranged a coaxial nozzle-tipped pipe for injecting upwardly a liqui-form material to be granulated, the assembly being inserted into a coaxial guide tube, and rack means secured to said tubular support for moving said assembly in a vertical direction.

2. Apparatus according to claim 1, wherein baffle devices are provided in the upper part of said granulator adapted to retain the fine particles.

3. Apparatus according to claim 1 wherein a cylindrical wall is subjacent the convergent section of the convergent-divergent system of said granulator, and above the gas stream inlet duct, an inverted frusto-conical baffle interiorly secured at its outer periphery to said subjacent wall and adapted for the dynamic equilibration of said gas stream.

4. Apparatus according to claim 3, wherein baffle devices are provided in the upper part of said granulator adapted to retain the fine particles.

(References on following page)

References Cited

UNITED STATES PATENTS

| | | |
|---|---|---|
| 2,399,717 | 5/1946 | Arveson. |
| 2,561,394 | 7/1951 | Marshall. |
| 2,797,981 | 7/1957 | Tooke. |
| 3,026,261 | 3/1962 | Mayfield et al. |
| 3,089,824 | 5/1963 | Wurster. |
| 3,110,626 | 11/1963 | Larson et al. |
| 3,112,220 | 11/1963 | Heiser et al. |
| 3,231,413 | 1/1966 | Berquin. |
| 3,237,596 | 3/1966 | Grass et al. |

NORMAN YUDKOFF, *Primary Examiner.*

J. SOFER, *Assistant Examiner.*

U.S. Cl. X.R.

34—57; 118—303